(No Model.) 3 Sheets—Sheet 1.

J. G. COCHRAN & J. KRITCH.
DISH WASHING MACHINE.

No. 391,782. Patented Oct. 30, 1888.

WITNESSES.
F. Wagner.
L. D. Hudson.

INVENTORS.
J. G. Cochran.
Jacob Kritch.
W. H. Burridge,
Atty.

(No Model.) 3 Sheets—Sheet 2.
J. G. COCHRAN & J. KRITCH.
DISH WASHING MACHINE.
No. 391,782. Patented Oct. 30, 1888.
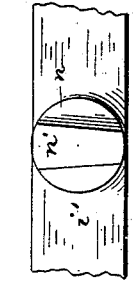
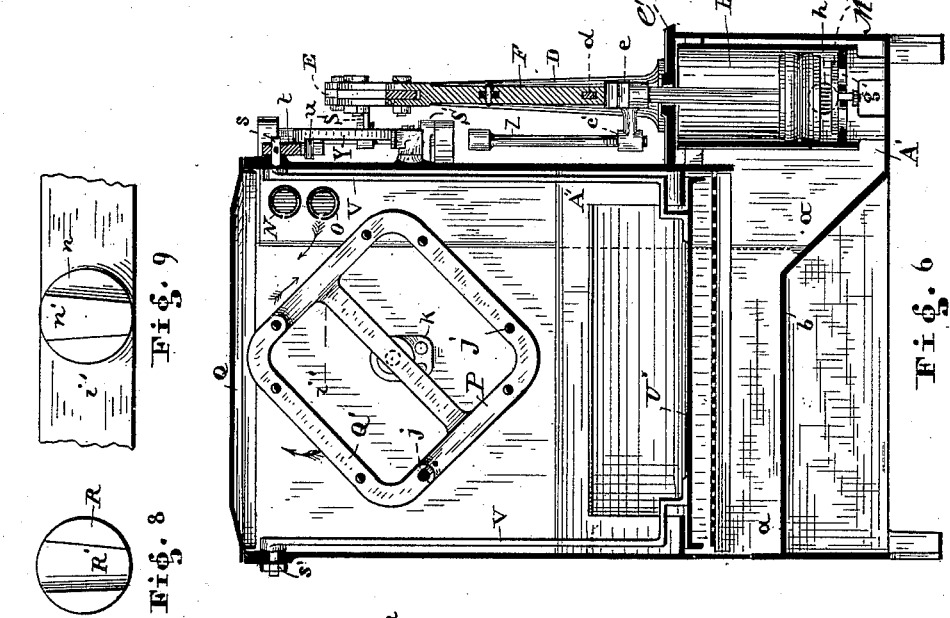
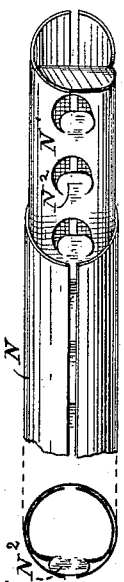
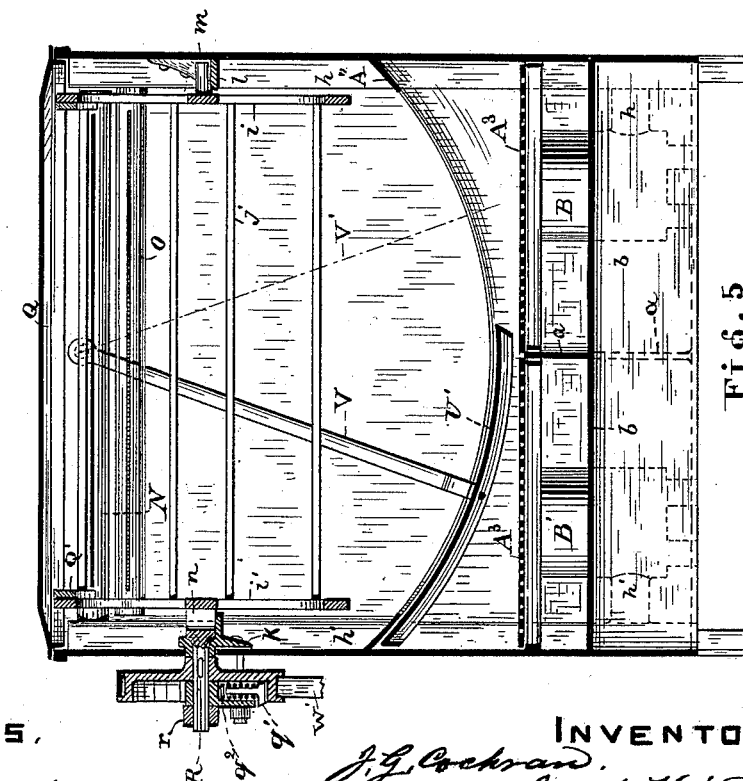
WITNESSES.
F. Wagner.
L. D. Hudson.
INVENTORS
J. G. Cochran.
Jacob Kritch.
W. H. Burridge
Atty.
N. PETERS, Photo-Lithographer, Washington, D. C.

(No Model.) 3 Sheets—Sheet 3.
J. G. COCHRAN & J. KRITCH.
DISH WASHING MACHINE.
No. 391,782. Patented Oct. 30, 1888.
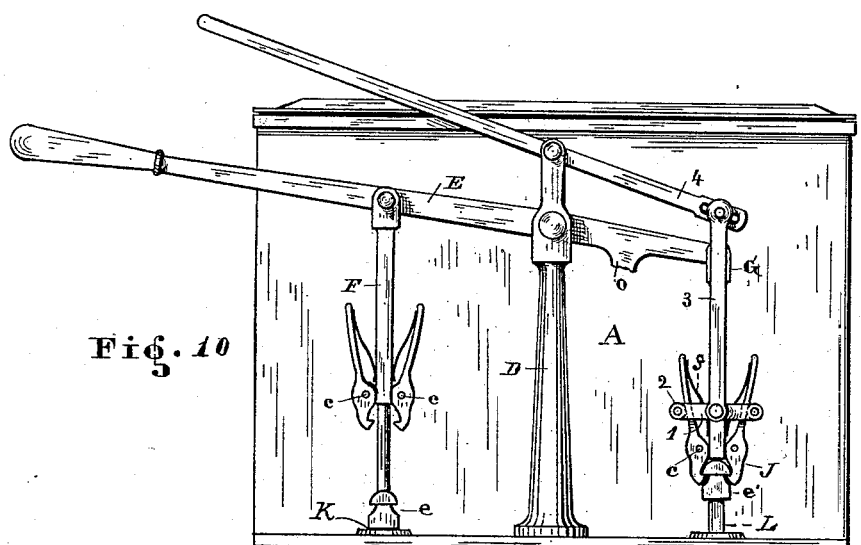
Fig. 10
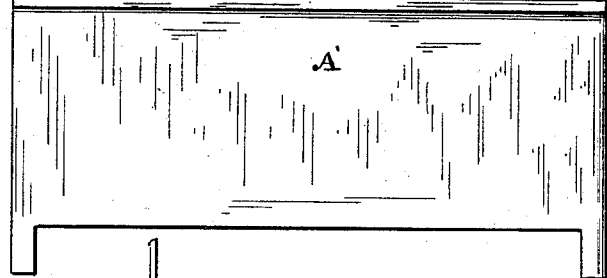
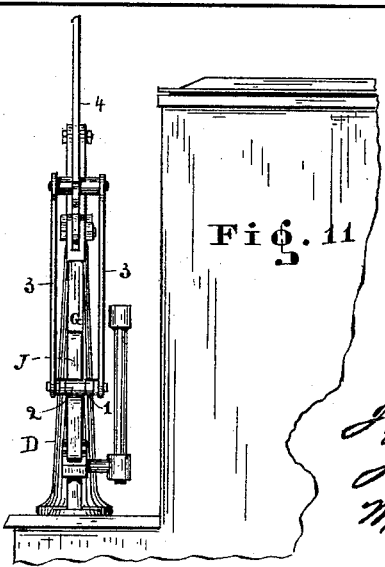
Fig. 11
WITNESSES.
B. F. Eibler.
L. D. Hudson.
INVENTORS.
J. G. Cochran.
J. Kritch.

UNITED STATES PATENT OFFICE.

JOSEPHINE G. COCHRAN, OF SHELBYVILLE, ILLINOIS, AND JACOB KRITCH, OF CLEVELAND, OHIO; SAID KRITCH ASSIGNOR TO SAID COCHRAN.

DISH-WASHING MACHINE.

SPECIFICATION forming part of Letters Patent No. 391,782, dated October 30, 1888.

Application filed August 19, 1887. Serial No. 247,389. (No model.)

*To all whom it may concern:*

Be it known that we, JOSEPHINE G. COCHRAN, of Shelbyville, in the county of Shelby and State of Illinois, and JACOB KRITCH, of Cleveland, in the county of Cuyahoga and State of Ohio, have invented a certain new and Improved Dish-Washing Machine; and we do hereby declare the following to be a full, clear, and complete description thereof.

Our invention consists in the peculiar construction and arrangement of certain devices adapted to a machine for washing dishes and other culinary utensils.

That the same may be more fully seen and understood, reference will be had to the accompanying drawings, in which—

Figure 4:
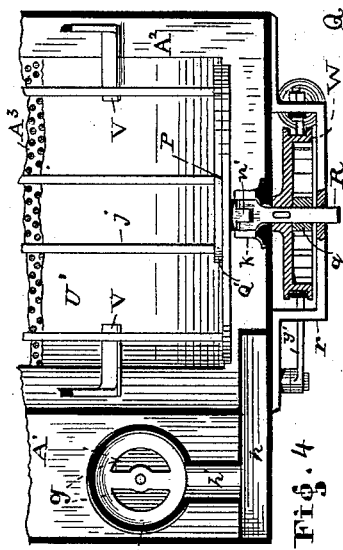
Figure 2:
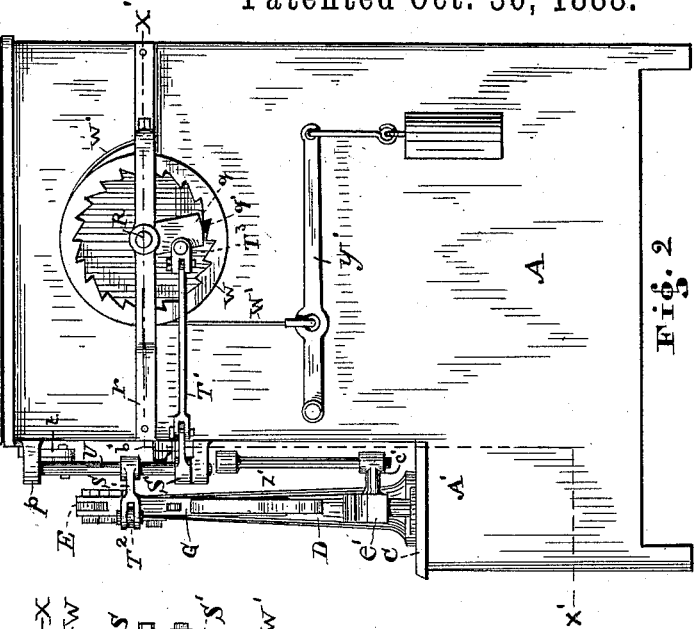
Figure 3:
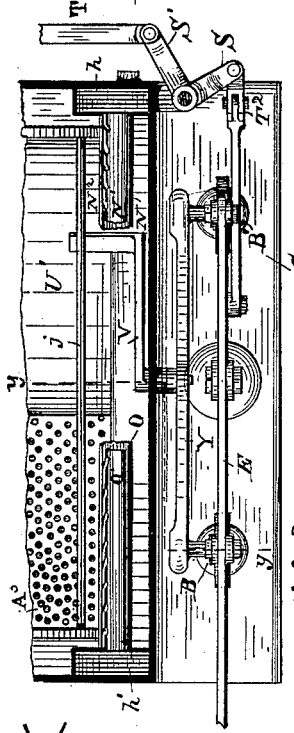
Figure 1:
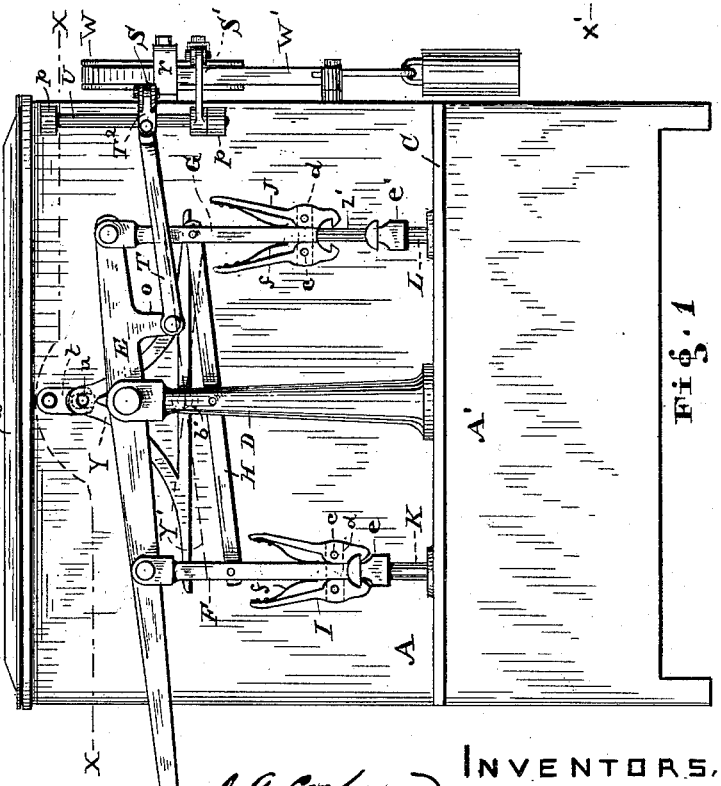

Figure 1 is a front elevation of the said machine. Fig. 2 is a side elevation of the same. Fig. 3 represents a partial horizontal section on line $x\,x$ of Fig. 1. Fig. 4 is a partial horizontal section on line $x'\,x'$ of Fig. 2. Fig. 5 illustrates an interior of the machine, looking toward the front part thereof. Fig. 6 is a transverse vertical section on line $y\,y$ of Fig. 3. Fig. 7 illustrates, enlarged, a device used in connection with the means for pouring liquid onto the articles to be washed, hereinafter described. Figs. 8 and 9 illustrate enlarged face views of the means used in connection with the grate for holding the dishes. Fig. 10 is a front view of a special arrangement for larger machines of this class, and Fig. 11 is a side view thereof.

Like letters of reference refer to like parts in the several views.

In the drawings, A represents a casing or box, which is preferably made of sheet metal in such manner as to answer the purpose for which it is intended. Said box is rectangular in form and provided at the lower front side with an extension to form with the box a tank, A', into which are placed the pumps B and B'. The pumps within said tank are separated by a partition, $a$, which divides the lower part of the interior of the box and also the tank into two compartments, so that each pump has its own water-supply chamber. The bottom plate, $b$, of the box A is raised in the rear and sloping downward in the tank (see Figs. 5 and 6) to accumulate the contents of the compartments nearest the pumps, thereby rendering them easier for operation.

Attached to the top of the tank A' is the plate C, to which is secured the standard D, Figs. 1 and 2. Said standard is adapted to a pivotal connection with the lever E, to which are hinged the parallel rods F and G and the tie-bar H, by means of which the parallel movement of the said rods is maintained. The free end of each of these rods is provided with a gripping device, I and J, respectively, by means of which connection with the plunger-rods K and L is had and interrupted instantaneously at will. Either one of these rods may be united with the lever E to operate its respective pump-plunger. The grips I and J will automatically connect with the rods K and L, if lowered far enough. For disconnection, all that is necessary is to contract the grip-handles above their pivotal connections $c\,c$ with the rods F and G, and either lower or raise the lever, as the case may be. The pivotal connection of said grips and rods is preferably had by means of the plate $d$, extending laterally across and through the rods F and G, as seen in cross-section in Fig. 6 and in the dotted lines in Fig. 1. The jaws of the grips are shaped correspondingly to the form of the heads $e\,e'$ of the rods K and L, to afford an easy and reliable connection with the same when held down over said heads by the aid of the springs $f$, as seen in Fig. 1. Owing to the resiliency of the springs, the jaws of the grips are always ready to slide down over the rounding or tapering form of the heads and to engage in the notches on either side of them. Either of the plunger-rods when disconnected will recede down and bear on the plate C, as seen in Fig. 10, thus giving ample chance or space for the vibration of the lever E and attachments to operate the pump-lift connection. The pumps are single-acting force-pumps.

For the larger sizes of these machines extra means are provided to facilitate the disconnection of the grip-handles J from the plunger-rod L. Over said handles is fitted the slide 1, as seen in Figs. 10 and 11, which slide is provided with rollers 2 (that bear on the outer sides of said handles) and pivoted side rods, 3, that connect the same with the lever 4. Said lever 4 is pivoted to an extension of the standard D and within easy reach for the operator to disconnect the plunger-rod when it is desired. On forcing the longer side of said lever downward the shorter end thereof will draw up the slide 1, thereby contracting the grip-handles for disengagement from the rod L. The rollers 2 promote the operation of said slide on the grip-handles in sliding down and up. On withdrawing from the handle the resiliency of the spring $f$, together with the weight of the slide and side rods, 3, will cause the downward movement of the slide, thereby relieving the grip-handles or adjusting the same in a ready condition for re-engagement with the plunger-rod L. These auxiliary means for disconnecting the outer pump bring both the pumps within easy reach of the operator and facilitate the manipulation of them.

The inlet-valve M is located and seated at the bottom of the barrel, as seen in Fig. 6, which valve on withdrawing the plunger will place the interior of the barrel in open relation with the outside thereof by means of the openings $g$, as seen in Fig. 4. In that figure the inlet-valve is removed for observation of the said openings. On the inward stroke of the plunger the valve M closes and the contents of the pump are forced out through the port $h$, located near the bottom of the pump-barrels. The rods K and L have a pivotal connection with their respective plungers at or near the bottom of the inside thereof. (Said connection is not shown in the drawings.) The purpose of these independent pumps is to force either hot water or soapsuds, with which the respective compartments of the tank A' are filled, into the slotted pipes N and O, Figs. 5 and 6, and discharge the water or soapsuds in the form of a spray or thin sheet over the dishes, &c., held in a suitable rack within the rotating grate P for washing the same.

Ordinarily the pumps are used alternately— that is, the pump B', containing the soapsuds, is employed first to free or clean the contents of the rack from the adhering substances, which will come off very readily owing to the force with which the spray is dashed against them, only a few strokes of the pump being required for that purpose. At every stroke of either of the pumps the grate P is making a part of a revolution in the direction of the arrow, as seen in Fig. 6. Thus each renewed spray will dash against the contents of the grate in every position they may assume during the rotation of the grate P. The means for rotating the grate will be presently referred to.

It requires but little experience on the part of the operator to determine the time necessary for cleansing the dishes within the grate without removing or lifting the cover Q of the box A; and when assured that the dishes, or whatever may be within the grate, are thoroughly cleansed the pump B' is exchanged for the pump B, in the manner above described. By means of this pump B the hot water is forced up, in, and through the pipe O, to rinse the dishes after being washed and while rotated by or within the grate P. All the articles are washed and rinsed with this machine in one continuous operation and are ready for table use after being taken out of the grate and rack.

The grate P consists of the square frames $i\ i'$ and a suitable number of bars, $j$, by means of which said frames are united and held a proper distance apart to fit in between the bearings $k$ and $l$, secured to the box A, Figs. 5 and 6. The grate P is provided with a gate, Q', as seen in Figs. 5 and 6, for the reception and removal of the racks containing the articles to be washed. The means for hinging and locking the gate to the grate may be arranged in any suitable manner. The racks above referred to are not claimed as a part of this invention; hence are not shown.

The frames $i\ i'$ are provided with cross-bars for the support of the pivots $m\ n$, of which $m$ is a plain pivot resting in the open bearing $l$. The pivot $n$ forms a tongued connection with the head of the shaft R, and both rest in the bearing $k$, as seen in Figs. 4 and 5.

Figs. 8 and 9 illustrate an enlarged face view of the said parts R and $n$. The groove R' and tongue $n'$ are both tapering, thus facilitating not only the connection and disconnection of the parts, but also making the removal of the grate possible from one side only, which side is preferably that opposite the gate. The means for rotating the grate P, before referred to, consists of a ratchet-and-pawl mechanism operated by a combination of levers which receive primary motion from the pump-lever E. Extending down from said lever E is an arm, $o$, from which arm pivotal connection is had with the lever S by means of the connecting-rod T and the intermediate joint, $T^2$. The lever S is secured to the vertical shaft U, and the shaft is held to the box A by means of the lugs $p$. Below the lever S is located the lever S' on the same shaft, U, imparting reciprocating motion to the pawl $q$ by means of the connecting-rod T'. Both the connecting-rods T and T' are provided with intermediate joints at $T^2$ and $T^3$, respectively, to compensate the swinging pivotal connections of the rods T T' and the levers S S'. The pawl $q$ engages into the teeth of the ratchet-wheel W, which are located around the inner circumference of said wheel. The pawl $q$ swings freely on the shaft R, whereas the wheel W is keyed thereto, as seen in Figs. 2, 4, and 5. Said pawl $q$ is provided with a shifter, $q'$, (see Figs. 2 and 5,) and a spiral spring, $q^2$, to keep said shifter in constant contact with the teeth of the wheel W and admit of the sliding on and engaging in the same when set in motion by the mechanism above referred to.

By means of the bracket $r$ an outside bearing for the shaft R is formed, and a fixed connection for the band W' is had, as seen in Figs. 2 and 4. The band W' is laid over the face of the wheel W and attached to a weighted lever, $y'$, pivoted underneath said wheel to the side of the box A, as seen in Fig. 2. The purpose of said band W' is to prevent the grate in any position from rolling if the contents were unevenly distributed within the same. Owing to the friction of the band on the wheel, power is required to turn said wheel even if the grate should be heavily loaded. It is intended that the movement of the wheel should be controlled by the pawl only.

That the soapsuds and hot water, which are alternately or successively used in washing and rinsing the dishes, when discharged through the pipes O and N may also be alternately and separately collected in the lower part of the box, which is in open relation with the compartments of the pumps B B', an automatic deflector, U', is provided for, as seen in Figs. 4, 5, and 6. Said deflector is suspended by means of the hangers V and pivots $s\ s'$, fitted to and within suitable bearings in the upper part of the box. To the pivot $s$ is secured the arm $t$, (see Figs. 1 and 6,) which arm terminates in a bifurcation, which embraces the pin $u$ of the rocker Y. This rocker is triangular in form, the base thereof having a central pivotal support within the front side of the box A, as seen at $b'$, Figs. 1, 2, and 6. This base of the rocker Y extends over the perpendicular pins Z Z', which are attached to the heads $e\ e'$. The pins Z Z' are adjusted to the required height within the arms $c'$ of said heads $e\ e'$, in order to tip the rocker far enough to one side or the other for the movement of the deflector U' from one compartment to the other when the lever E is operated, so that, for instance, when the pump B' is adjusted in connection with the lever E the plunger is raised to draw in soapsuds. The pin Z' will then tip the rocker Y to a position as indicated by the dotted line Y' of Fig. 1, and the hanger V will assume a position as shown by the dotted line V' of Fig. 5, in which position it will remain as long as the pump B' is used, and the soapsuds, which are discharged into the box, will have to flow back to the respective compartment in so far as the deflector U' covers up the entire area of the hot-water tank. The pivot $s'$ is provided with a nut, by means of which the frictional contact of the hanger V and the bearing inside the box can be increased, so that a certain amount of force is required to move the same; or, in other words, it will remain hanging over the hot-water tank until the pump B' is exchanged for the pump B. The pin Z will then draw the rocker Y in a reversely-inclined direction from that above referred to, which results in moving the deflector over the soapsuds-tank, as seen in Fig. 5, and the hot water forced in through pipe O will flow back to its appropriate compartment. Close above the deflector, on the inside of the casing, is a guard, A'', to ward off all the liquids onto the deflector when covering either one of the compartments that should not be filled.

To obtain a uniform spray of water along the entire length of the slotted pipes within the box A, auxiliary pipes N' O' are placed inside the pipes N and O. Said pipes only extend a part of the entire length of the outside pipes, and instead of one slot they are provided with a series of holes that have extending from them shields or deflectors, as seen at $N^2$, Fig. 7, which incline to a reverse direction of the stream coming from the pumps, thus counteracting the same and directing the water or soapsuds to flow out near the front of the pipe as well as at the rear end. The auxiliary pipes are so set within the pipes N and O that the deflectors $N^2$ come to stand directly in line with the slots of the outside pipes, thus promoting the discharge of the liquids. Without the aid of this arrangement of pipes to counteract the stream when entering the pipes no liquids would be discharged near the beginning of the slots, owing to the force of the stream, which leads in a straight forward direction and only discharges nearer the end of the pipes.

To prevent any of the substances or particles washed from the dishes from entering the pumps and clogging up the pipes, perforated diaphragm-plates $A^3$ are placed under the deflector to strain all the suds or water before it enters the pumps.

What we claim as our invention, and desire to secure by Letters Patent, is—

1. In a dish-washing machine, the deflector U', connected with the rocker Y, pivoted to the exterior of the machine, in combination with the perpendicular pins Z Z' of the pump-plunger rods, and the means for operating said rods, causing simultaneously an automatic interchange of the deflector, substantially as and for the purpose set forth.

2. In a dish-washing machine, the slotted discharge-pipes of the force-pumps, having in their front ends inserted auxiliary perforated pipes provided with the deflectors $N^2$, to effect a discharge of liquid through the entire length of the said slotted pipes, substantially as and for the purpose set forth.

3. In combination with the force-pumps of a dish-washing machine, the standard D, lever E, connecting-rods F G, parallel rod H, grippers I J, and plunger-rods K L, substantially as and for the purpose set forth.

In testimony whereof we affix our signatures in presence of two witnesses.

JOSEPHINE G. COCHRAN.
JACOB KRITCH.

Witnesses:
W. H. BURRIDGE,
B. F. EIBLER.